United States Patent Office 3,290,322
Patented Dec. 6, 1966

1

3,290,322
OXIDATION OF STEROIDS
Bjarte Löken, Shrewsbury, Mass., and Irving V. Sollins, Rye, N.Y., assignors to Phytogen Products, Inc., Mamaroneck, N.Y., a corporation of Delaware
Filed Feb. 12, 1965, Ser. No. 432,381
8 Claims. (Cl. 260—397.4)

The present invention relates to a method for the direct oxidation of a $\Delta^5$-3-hydroxy steroid to a $\Delta^5$-3-keto-steroid and to its isomerization in situ to the $\Delta^4$-3-keto-steroids. The present procedure is applicable to the preparation of $\Delta^4$-3-keto-androstenes and pregnenes starting from the corresponding $\Delta^5$-3-hydroxy steroids. The present invention relates also to certain novel $\Delta^5$-3-keto-pregnene steroids.

The need for an efficient low cost procedure to effect conversion of the $\Delta^5$-3-hydroxy androstenes and pregnenes to the corresponding $\Delta^4$-3-keto-steroids has long faced the art. Known techniques, such as the Oppenauer method involving the oxidation with aluminum isopropoxide in the presence of cyclohexanone, and the oxidation with chromic acid after the $\Delta^5$ double bond has been protected by bromine addition, are not completely satisfactory. It is believed that the method of the present invention as hereinafter described constitutes a substantial improvement over prior art conversion techniques.

It has now been found that the $\Delta^5$-3-hydroxy androstenes and pregnenes can be oxidized with chromium trioxide in aqueous sulfuric acid when in acetone solution by employing short reaction times of the order of 3 to 6 minutes, followed by quenching the reaction, as for example by pouring the solution into aqueous ferrous sulphate. The steroid which then precipitates is the $\Delta^5$-3-ketone steroid in a relatively high state of purity. If desired, isomerization can be effected in situ, in the presence of the ferrous sulphate, by cutting down the water content and by adding additional sulphuric acid. Thereby the $\Delta^4$-3-ketone constitutes the precipitant and there is no need to isolate the intermediate $\Delta^5$-3-ketone.

By effecting the isomerization concurrently with distillation the acetone solvent can be recovered effectively at the same time. The crude $\alpha,\beta$-unsaturated steroidal ketone may be recovered readily by filtration of the residual aqueous sludge. A single recrystallization of this crude product usually results in a relatively pure compound at yields from 85–95%, the lower yields being consistent with the slight water solubility of some steroids, e.g., 17-$\alpha$-methyl testosterone.

As can readily be seen from the foregoing brief description the present procedure offers advantages over the prior art procedures, including the following:

(a) Direct chromic acid oxidation can be operated as a one pot reaction;
(b) The solvent (usually acetone) is recovered directly from the reaction vessel;
(c) The reaction can be engineered as a continuous operation;
(d) Higher yields are obtained;
(e) The intermediate $\Delta^5$-3-ketone need be isolated only if it is the desired product;
(f) The brief reaction period (3–6 minutes) permits a substantial through put of steroid in a given reactor during a single shift;

2

(g) The reaction is economical since only inexpensive inorganic materials are consumed (i.e., ferrous sulphate, chromium trioxide, sulfuric acid).

While acetone has been indicated as the solvent, certain limited substitutions can be made for the acetone. Thus, for example, tetrahydrofuran can be employed subject, however, to a slower oxidation rate at the 3-hydroxy position.

Butanone acts very much like acetone in the reaction; however it is subject to certain disadvantages since isolation of the product and solvent recovery are not as facile as with acetone, largely because of the higher boiling point of butanone.

Some possibility exists for employing an additional solvent along with the acetone for the purposes of increasing the steroid solubility in the reaction mixture. However, the solvent mixtures employed, e.g., 1,1-dichloromethane-acetone have been found subject to incomplete reaction and decreased oxidative selectivity. In addition, a more complex solvent recovery system must be employed. All in all, acetone is by far the preferred solvent.

The reaction itself is effected at temperatures in the range of 0–25° C., the lower end of the temperature range being best for the $\Delta^5$-steroids which do not have 6-methyl (or alkyl) substituents. This experimentally observed facet of the present invention apparently revolves around the greater stability of the C–5,6 double bond when a 6-methyl substituent is present on the steroid molecule. Isomerization to the $\Delta^4$ occurs much slower in the instance of the 6-methyl steroids. Conversely, the greater stability of the C–5,6 double bond in the 6-methyl steroids permits: the oxidation reaction to be shortened; less acetone to maintain the steroid in solution; and employment of the higher end of the 0–25° C. reaction temperature range.

Provided the reaction contact time is maintained within the prescribed limits of below about 6 minutes, 3–6 minutes being the preferred range, the reaction is quite selective. Isolated double bonds located elsewhere in the steroid molecule are not affected by the chromic acid reagent, as a rule. Generally steroids having a double bond at C–7, C–9 (11), C–14 (15), C–16, can be oxidized without giving rise to bothersome concentrations of undesired side products.

Selection of the proper amount of water for quenching reaction by the ferrous sulphate and the subsequent isomerization in situ does not present any particular problem since generally the $\Delta^5$-3-ketones are more soluble in aqueous acetone at reflux temperatures than the corresponding $\Delta^4$-3-ketones. By and large the water present with the ferrous sulphate is about equal to the volume of the original acetone solution.

During the course of the combined isomerization and solvent recovery distillation step the $\Delta^4$-3-ketone precipitates out of solution in a granular form. A small amount of sulphuric acid can be added during this step to adjust the pH down sufficient to keep the $Fe^{++}$, $Fe^{+++}$, and $Cr^{+++}$ in solution as the sulphates.

Mention has already been made that some of the compounds producable in pure form according to practice of the present invention are in and of themselves part of the present invention. The novel compounds have the following formula

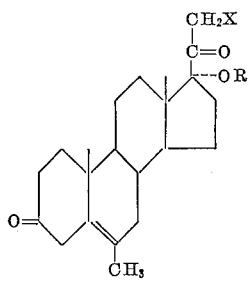

wherein X is H or F, and R is H or lower acyl. These compounds are useful intermediates, as for example in the production of the 3-ethylene ketals disclosed and claimed in copending application by Bjarte Loken et al., Serial No. 327,072, filed November 29, 1963, now U.S. Patent No. 3,248,391, and the 3-thiketals disclosed and claimed in Serial No. 200,347 (Irving Scheer), filed June 6, 1962, now U.S. Patent No. 3,162,629. Ketalization progresses much faster with the $\Delta^5$-3-ketones than with the corresponding $\Delta^4$-3-ketones described in these applications, both when transketalization with 2-methyl-2-ethyl-1,3-dioxolane and when the direct azeotropic distillation with ethylene glycol/benzene are employed, both conducted with p-toluenesulfuric acid as a catalyst. Also, the overall yield from a starting 6α-methyl-$\Delta^5$-3-hydroxy compound via the $\Delta^5$-3-ketone to the 3-ethylene ketal is higher than when the Oppenauer oxidation is employed to make the 6α-methyl-$\Delta^4$-3-ketone intermediate.

It is believed that the facile ketal formation must be because the double bond is already present in the quaternary C–5,6 position, and that no activation energy is then needed for migration of the double bond to that position; the amount of acid catalyst and the reaction rate is essentially that for a saturated 3-ketone (which is known to ketalize readily).

The $\Delta^5$-3-keto-6-alkyl compounds need not be isolated when they are to be used to obtain the 3-ethylene ketals. Thus the reaction product of the oxidation reaction may be extracted with dichloromethane, the dichloromethane extract washed twice with water and concentrated to dryness. The oily residue is subjected to the ketalization procedure. By this measure the losses on crystallization of the intermediate compound is reduced to almost nil.

In addition to their use as intermediates, these novel compounds have biologic activity. Thus 17α-acetoxy-6-methyl-pregn-5-ene-3,20-dione has been found to be a potent progestational material. It effectively hinders ovulation in laboratory test animals. In oral administration the duration of progestational activity and antiovulatory properties surpassed those of 17α-acetoxy-6α-methyl-pregn-4-ene-3,20-dione. Actually the present compounds have a wide but different spectrum of pharmacological properties, as compared to the $\Delta^4$-3-ketones. In some instances the biological action is reversed. For example, when rats are ovariectomized on the 6th day after mating and subcutaneously or orally given 6α-methyl-17α-acetoxyprogesterone (0.1 mg.) for 7 days and the present $\Delta^5$ compounds at the same dosage level, only those rats which were given 6α-methyl-17α-acetoxyprogesterone maintained pregnancy. Such very selective progestational action makes the present compounds most useful when the prevalence of undesired effects may limit the application of the known progestational substances.

For better understanding of the practice of the present invention the following examples thereof are presented.

EXAMPLE I 1.0 g. of $\Delta^5$-pregnen-3β-ol-20-one was dissolved in 175 ml. of acetone. The solution was cooled in ice for 10 minutes and 2 ml. of Jones' solution added quickly and the mixture maintained in the bath for 3 minutes under violent agitation. The color changed from orange to greenish brown. The reaction mixture was then poured into a round bottomed flask containing 100 ml. of an aqueous solution containing therein 1 g. ferrous sulfate, 1 ml. concentrated sulfuric acid. This mixture was heated on the steambath under agitation until no more acetone distilled off. The mixture was cooled and filtered to recover the granular precipitate. It was washed on the filter with liberal amounts of water, collected, and dried. The total weight of crude product was 1.05 g., and the color slightly greyish green. This material was ground in a mortar with 250 mg. of activated charcoal, and transferred quantitatively to an extraction timbler (50 mg. more charcoal used for the transfer), which was placed in a Soxhlet extraction apparatus and extracted exhaustively with ether. The ether extract was transferred to a test tube and concentrated further to a final volume of about 2 ml. The crystals were filtered, washed on the filter with a little hexane, collected and dried. There was obtained 945 mg. progesterone, M.P. 128.5–130°, $[\alpha]_D$, 200° (chlf.). The crystals were white and found to be identical in all respects with an authentic specimen (by mixed melting point and infrared comparison).

EXAMPLE II

To a solution of 1.0 g. dehydroepiandrosterone in 135 ml. of acetone, cooled in an ice water bath to 0° C., 2.1 ml. of Jones' solution was added and the mixture stirred (in the ice bath) for 3 minutes. The reaction mixture was poured into a flask containing 0.7 g. ferrous sulfate, 0.5 ml. sulfuric acid and 85 ml. water, and heated on a steambath under agitation until no more acetone distilled off. The granular precipitate was filtered, water washed, dried, and recrystallized from ether. 875 mg. androstenedione was obtained, M.P. 171.5–173°, $[\alpha]_D$, 189° (chlf.). Found to be identical with an authentic specimen.

EXAMPLE III 1.0 g. of 3β-hydroxy-21-acetoxy-16α,17α-epoxy-pregn-5-en-20-one—an intermediate in the commercial synthesis of Reichstein's Substance "S"—was dissolved in 130 ml. of acetone and cooled in an ice water bath to 0° C. 2.0 ml. of Jones' solution was added and the mixture maintained in the ice water bath under stirring for 4 minutes. 10 ml. of an aqueous solution containing 0.65 g. ferrous sulfate was added and the acetone distilled off in vacuum. The residue was extracted with dichloromethane (25 ml.). This extract was filtered and evaporated to dryness. A sample of the residue was shown to be essentially 21-acetoxy-16α,17α-epoxypregn-5-ene-3,20-dione. The following illustrates how this crude residue can be converted to the 16,17-bromhydrin of the $\Delta^4$-3-ketone, thus effecting the oxirane ring opening and the double bond migration from the C–5,6 position to the C–4,5 position in one operation. The resulting 16,17-bromhydrin is in one step convertible to Reichstein's substance "S," monoacetate (17α-hydroxy-21-acetoxypregn-4-ene-3,20-dione) by refluxing in methanol with Raney Ni.

To the residue (after the oxidation above) was added 10 ml. glacial acetic acid, and 5 ml. was distilled off in vacuum to remove residual dichloromethane. To this solution was added during cooling to +15°, 1 ml. of a solution of 32% hydrogen bromide in acetic acid (pre-cooled to 15°). The mixture was kept agitating for awhile at room temperature (15–20 minutes) during which period it gradually turned into a crystalline slurry. This slurry was cooled to 16° and maintained for 15 minutes at this temperature, filtered, and the crystals with a little ether collected and dried in a dessicator prepared with soda lime. 1.12 g. of 17α-hydroxy-21-acetoxy-16β-bromopregn-4-ene-3,20-dione was obtained, M.P. about 175–177° (dec.).

EXAMPLE IV

By subjecting the $\Delta^5$-3-hydroxy starting materials as indicated below to the oxidation conditions of this invention, the appropriate $\Delta^5$-3-ketonic intermediates were isomerized without isolation, and transferred to the end products as indicated.

| Starting Material | Method Followed | End Product | Yield, percent |
|---|---|---|---|
| 21-acetoxy-Δ⁵-pregnenolone. | Ex I | Desoxycorticosterone acetate. | 90 |
| 3β,17α-dihydroxy-21-acetoxy-pregn-5-ene-11,20-dione. | Ex I | Cortisone, 21-acetate. | 92 |
| Δ⁵-androsten-3α,17β-diol 17-acetate. | Ex II | Testosterone acetate. | 88 |
| 3β,11α,17α-trihydroxy-21-acetoxy-pregn-5-en-20-one. | Ex II, but 3 ml. Jones' solution used. | Cortisone, 21-acetate. | 85 |
| 16α,17α-epoxy-Δ⁵-pregnenolone. | Ex III | 17α-hydroxy-16β-bromopregn-4-ene-3,20-dione. | 90 |
| 16-dihydro-Δ⁵-pregnenolone. | Ex II | 16-dehydroprogesterone. | 84 |
| 6-methylpregnenolone. | Ex I | 6α-methylprogesterone. | 94 |
| 3β-hydroxy-17α-acetoxy-6-methylpregn-5-en-20-one. | Ex I | 6α-methyl-17α-acetoxy progesterone. | 94 |

EXAMPLE V

To a solution of 1.2 g. of 3β-hydroxy-17α-acetoxy-6-methylpregn-5-en-20-one (M.P. 224–226°; [α]$_D$, −70° (chlf.)) in 214 ml. of acetone cooled to 0°, was added 2.4 ml. of Jones' solution and the reaction mixture maintained in the ice water bath under stirring for 5 minutes then dumped into 2l. of a mixture of saturated saline solution and ice. The mixture was allowed to stand until the ice melted. The microcrystalline precipitate was filtered off, washed with distilled water, and dried overnight at 50° C. This first crop of 17α-acetoxy-6-methylpregn-5-ene-3,20-dione weighed 602 mg., M.P. 142–145°, after recrystallization from aqueous methanol; [α]$_D$, +6° (chlf.). The infrared spectrum did not show any band at the 6.05 to 6.10μ region which would have indicated presence of a Δ⁴-3-ketone moiety.

By extraction of the mother liquor with dichloromethane, additional material obtained which could be purified by chromatography on silica gel.

EXAMPLE VI

The method of Example V was applied to the starting materials listed below. The 21-fluoro compounds were obtained according to C. Bergstrom, P. B. Soleman, R. Nicholson, R. M. Dodson: J. Am. Chem. Soc. 82, 2322 (1960). The 17-hexanoyloxy derivative was prepared from 6-methyl-17α-hydroxy-Δ⁵-pregnenolone, 3-monoacetate by heating with the appropriate anhydride to 50–60° C. in the presence of catalytic amounts of para-toluenesulfonic acid, followed by partial saponification of the 3-acetate group with 1.1 equivalents of potassium carbonate in aqueous methanol.

| Starting Material | Obtained Δ⁵-3-ketone |
|---|---|
| (a) 3β,17α-dihydroxy-6-methyl-pregn-5-en-20-one. | 17α-hydroxy-6-methylpregn-5-ene-3,20-dione. |
| (b) 6-methylpregnenolone | 6-methylpregn-5-ene-3,20-dione. |
| (c) 21-fluoro-17α-acetoxy-6-methyl-Δ⁵-pregnenolone. | 21-fluoro-17α-acetoxy-6-methyl-pregn-5-ene-3,20-dione. |
| (d) 21-fluoro-17α-hydroxy-6-methyl-Δ⁵-pregnenolone. | 21-fluoro-17α-hydroxy-6-methyl-pregn-5-ene-3,20-dione. |
| (e) 17α-hexanoyloxy-6-methyl-Δ⁵-pregnenolone. | 17α-hexanoyloxy-6-methyl-pregn-5-ene-3,20-dione. |

EXAMPLE VII

This example illustrates the use of this invention to arrive at the useful Δ⁵-3-ethylene ketal compound of the copending application as well as the Δ⁵-3-thioketal of S.N. 200,347, now Patent No. 3,162,629.

(a) Δ⁵-3-ethylene ketal

The compound of Example V (17α-acetoxy-6-methyl-pregn-5-ene-3,20-dione, 1.0 g.) was dissolved in 32.5 ml. of 2-methyl-2-ethyl-1,3-dioxolane and 10 mg. of p-toluenesulfonic acid monohydrate added, and the mixture barely boiled for very slow distillation (7 hours). The solution was cooled and extracted in a separatory funnel with 2 N sodium carbonate solution, dried over anhydrous sodium sulfate solution, and the solvent removed by evaporation under reduced pressure. The residue was recrystallized in ether to give 0.82 g. of 17α-acetoxy-3-ethylenedioxy-6-methylpregn-5-en-20-one, M.P. 186–189°, which proved to be identical with an authentic specimen prepared from 6α-methyl - 17α - acetoxy-progesterone by mixed melting point determination and infrared comparison.

Also the residue left after evaporating the dichloromethane extract of the aqueous mother liquors of Example V gave directly the same ketal when subjected to the procedure above.

(b) Δ⁵-3-thioketal

The compound of Example V (17α-acetoxy-6-methyl-pregn-5-one-3,20-dione, 5.0 g.) was dissolved in 15 ml. dichloromethane. 3 ml. ethane dithiol was added and the mixture was cooled to +5° while stirring. At this temperature 0.7 ml. of a 1.7 M hydrogen chloride in anhydrous ether was added and the temperature allowed to go to 15°. 75 ml. of ice cold methanol was added and the mixture stirred for 45 minutes at 0 to 5°. The resultant crystalline precipitate was filtered and washed on the filter with 10 ml. of cold methanol (−10° C.). The material was collected and dried overnight to give about the same weight (as input) of 6-methyl-17α-acetoxy-Δ⁵-pregnen-20-one-3-ethylene thioketal, M.P. 266–270°.

The Jones' solution referred to in the above examples was prepared by diluting 67.7 g. chromium trioxide. 57.5 ml. concentrated sulfuric acid with distilled water to a final volume of 250 ml.

What is claimed is:

1. A compound of the structural formula:

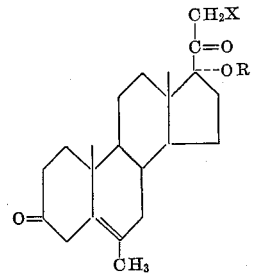

wherein: X is a member of the group consisting of H and F; and R is a member of the group consisting of H and lower acyl.

2. 17α-acetoxy-6-methyl-pregn-5-ene-3,20-dione.

3. 17α-acetoxy-21-fluoro-6-methyl pregn - 5 - ene - 3,20-dione.

4. The procedure for converting 3-hydroxy-Δ⁵-androstene and pregnene steroids into the corresponding 3-keto-Δ⁵-steroids which comprises reacting a solution of the steroid in a solvent selected from the group consisting of acetone, tetrahydrofurane and butanone with chromic oxide and sulfuric acid at a temperature in the range of 0–25° C. for a period not exceeding about 6 minutes, and thereafter quenching the reaction.

5. The procedure for converting 3-hydroxy-Δ⁵-androstene and pregnene steroids into the corresponding 3-keto-Δ⁵-steroids which comprises reacting a solution of the steroid in a solvent selected from the group consisting of acetone, tetrahydrofurane and butanone with chromic oxide and sulfuric acid at a temperature in the range of 0–25° C. for a period not exceeding about 6 minutes, thereafter quenching the reaction, then recovering the 3-keto-Δ⁵-steroid product.

6. The procedure of converting 3-hydroxy-Δ⁵-androstene and pregnene steroids into the corresponding 3-keto- $\Delta^4$-steroids which comprises reacting a solution of the steroid in a solvent selected from the group consisting of acetone, tetrahydrofurane and butanone with chromic oxide and sulfuric acid at a temperature in the range of 0–25° C. for a period not exceeding about 6 minutes, thereafter quenching the reaction in aqueous ferrous sulfate, then recovering the 3-keto-$\Delta^4$-steroid product.

7. 17α-hydroxy-6-methyl-pregn-5-ene-3,20-dione.
8. 17α-hydroxy-21-fluoro-6-methyl-pregn-5 - ene - 3,20-dione.

No references cited.

LEWIS GOTTS, *Primary Examiner.*

HENRY A. FRENCH, *Assistant Examiner.*